United States Patent [19]
Sensi

[11] 3,930,829
[45] Jan. 6, 1976

[54] MOVABLE DAM BARRIERS FOR USE IN THE MANUFACTURE OF A GLASS RIBBON ON A MOLTEN METAL BATH

[75] Inventor: John E. Sensi, Arnold, Pa.
[73] Assignee: PPG Industries, Inc., Pittsburgh, Pa.
[22] Filed: Oct. 15, 1974
[21] Appl. No.: 514,980

[52] U.S. Cl................. 65/65 A; 65/99 A; 65/182 R
[51] Int. Cl.² ........................................ C03B 18/02
[58] Field of Search .............. 65/65 A, 99 A, 182 R

[56] References Cited
UNITED STATES PATENTS

| | | | |
|---|---|---|---|
| 3,317,302 | 5/1967 | Misson............................. | 65/99 A |
| 3,420,647 | 1/1969 | Charnock ......................... | 65/65 A |
| 3,485,617 | 12/1969 | Lawrenson........................ | 65/182 R |
| 3,539,320 | 11/1970 | Plumat et al..................... | 65/65 A X |
| 3,843,345 | 10/1974 | Harrel et al..................... | 65/99 A X |

Primary Examiner—Arthur D. Kellogg
Attorney, Agent, or Firm—Donald Carl Lepiane; Pollock E. Kears

[57] ABSTRACT

Movable lateral and longitudinal dam barriers are provided in a glass forming chamber of the type containing a molten metal. The movable lateral dam barriers control longitudinal convection currents in the molten metal to control the temperature of the glass as it moves through the forming chamber. The lateral dam barriers can be moved to change longitudinal convection currents to achieve the optimum temperature conditions in the glass ribbon for producing flat glass of a specific thickness at any desired ribbon speed. The lateral dam barrier can also be moved to change convection currents and glass ribbon temperature to facilitate the change over from producing a glass ribbon of one thickness to a glass ribbon of a different thickness. The movable longitudinal dam barriers control lateral convection currents in the molten metal to flatten the edge-to-edge temperature profile across the ribbon of a glass ribbon moving through the chamber supported on the molten metal.

24 Claims, 20 Drawing Figures

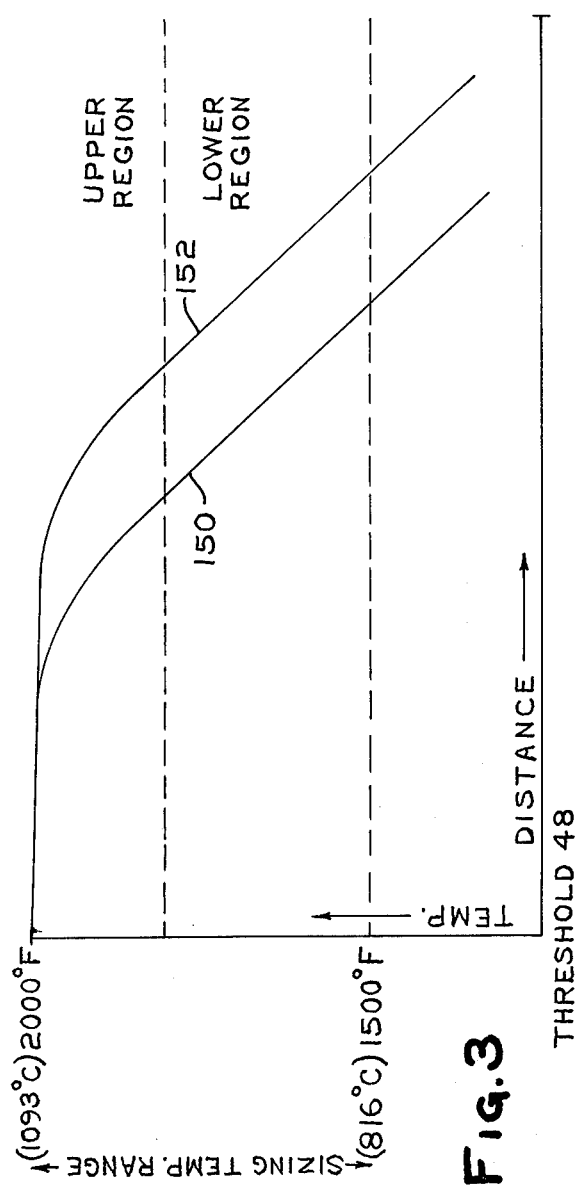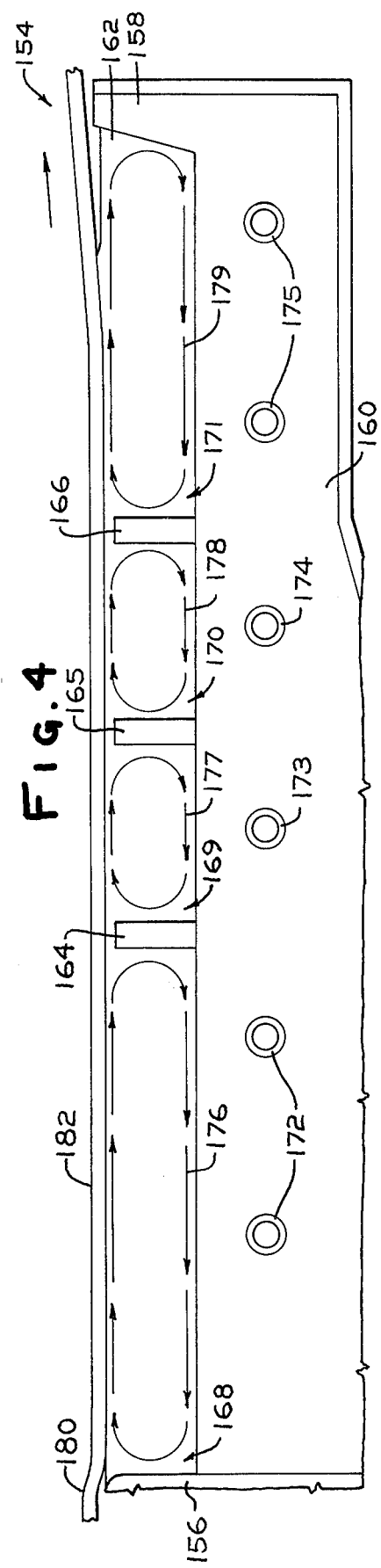

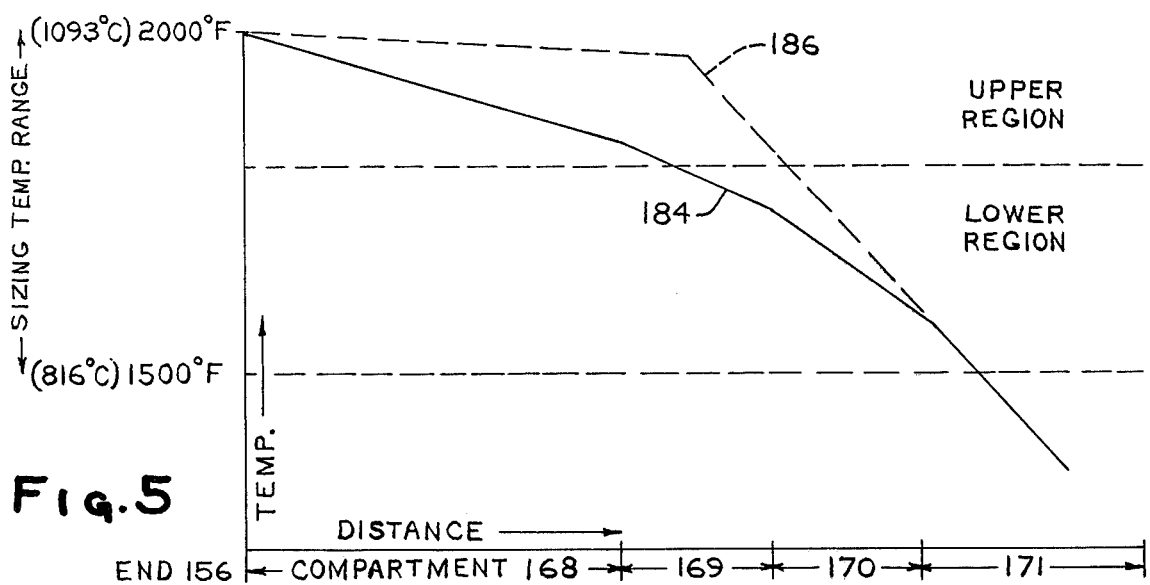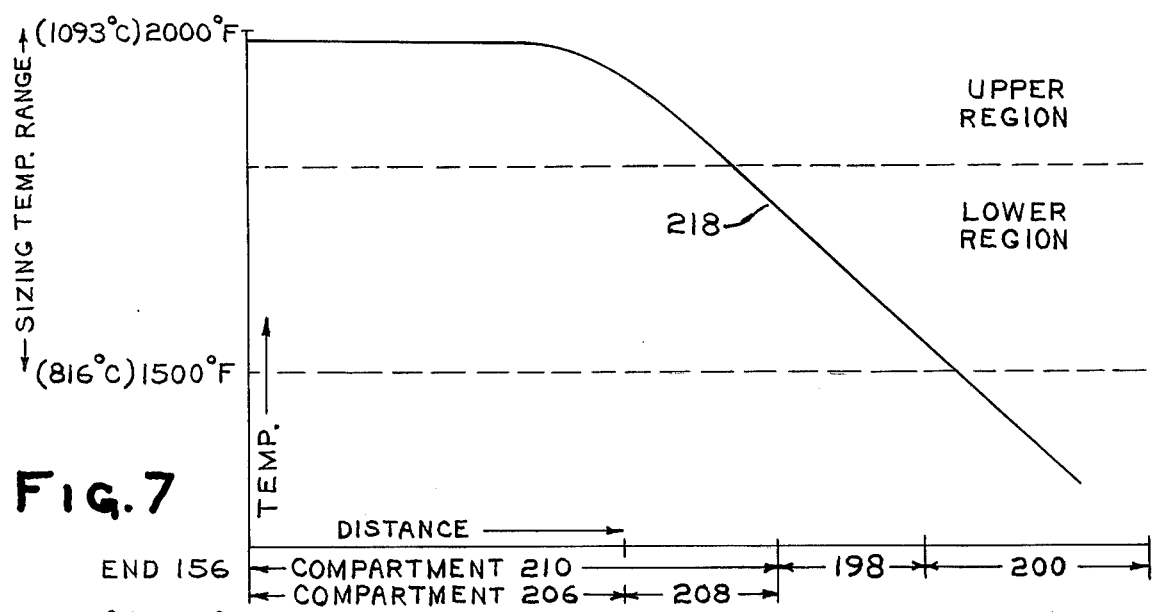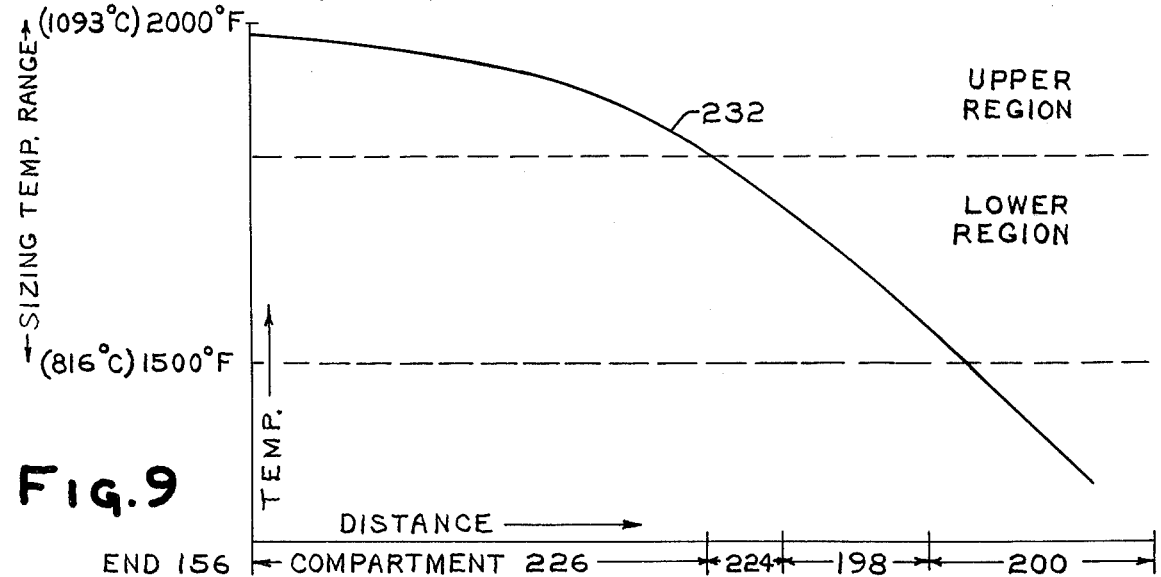

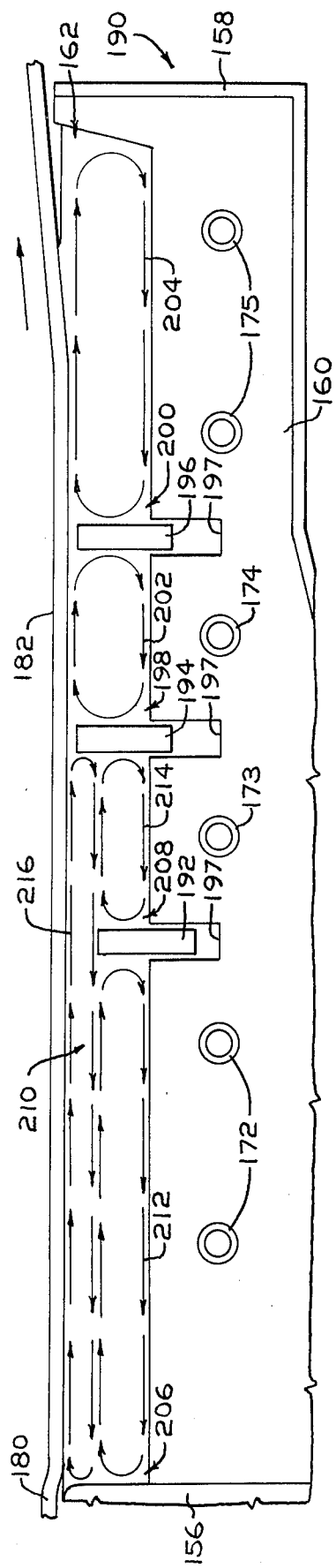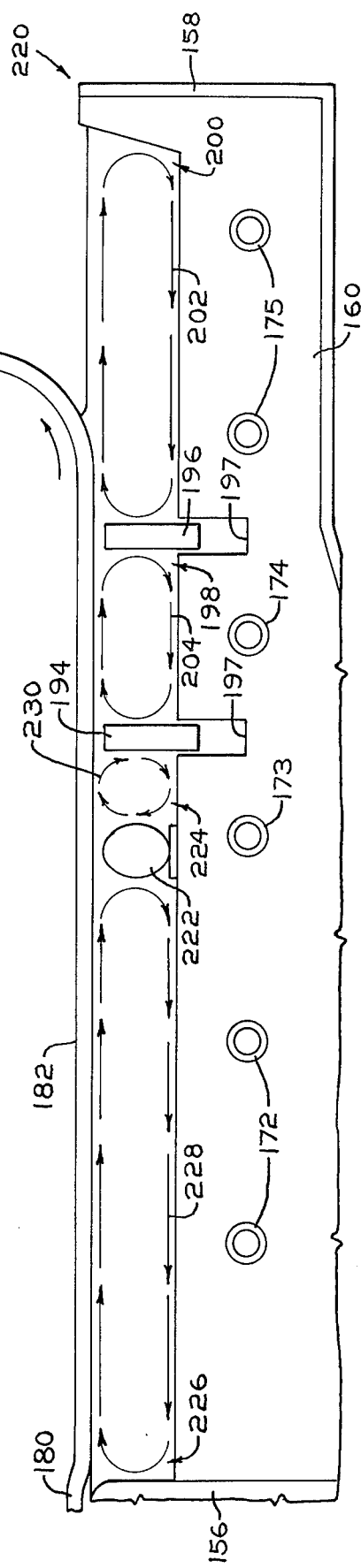
Fig. 6
Fig. 8

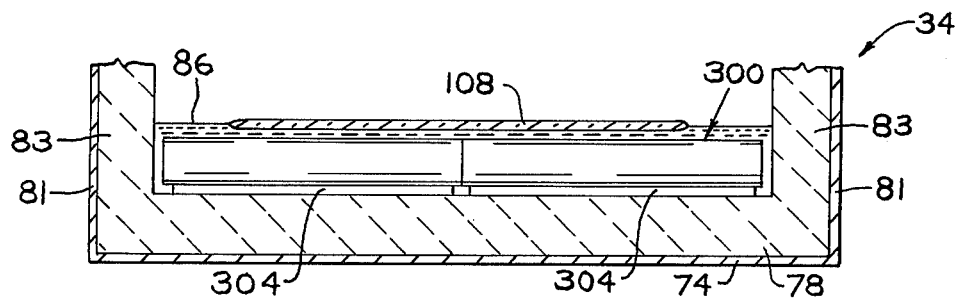
Fig.15
Fig.16
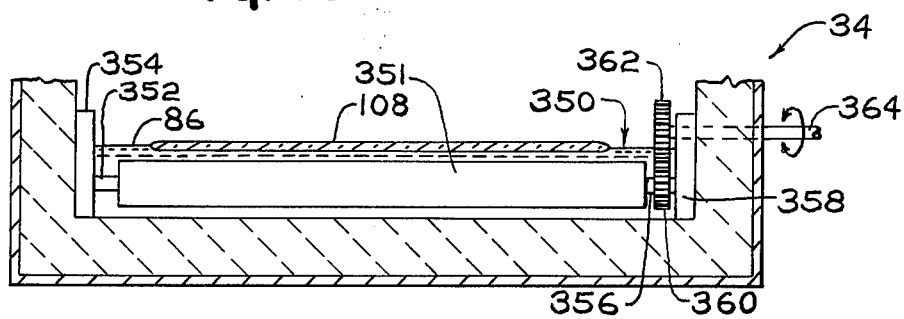
Fig.18
Fig.19
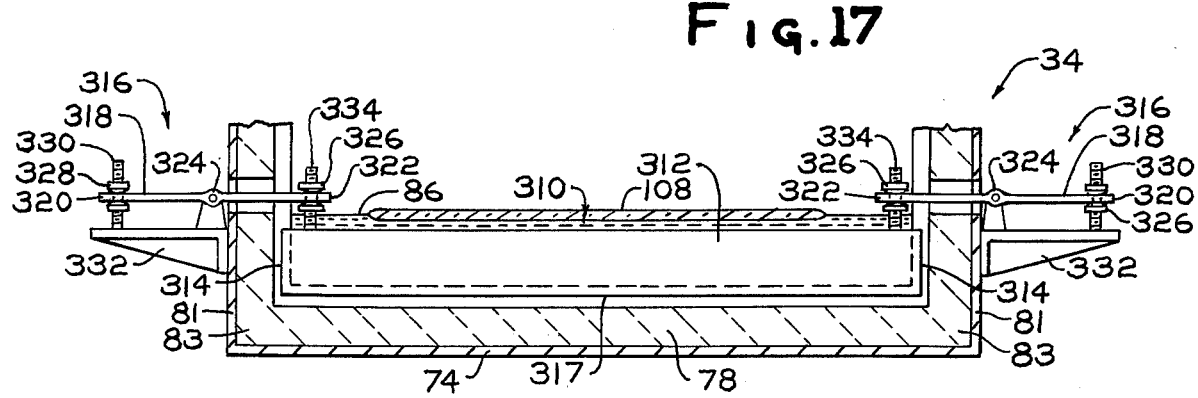
Fig.17

MOVABLE DAM BARRIERS FOR USE IN THE MANUFACTURE OF A GLASS RIBBON ON A MOLTEN METAL BATH

CROSS REFERENCE TO RELATED APPLICATIONS

The dam barriers of this invention may be used with the teachings of U.S. Pat. No. 3,843,346 granted to Charles K. Edge and Gerald L. Kunkle and U.S. Pat. application Ser. No. 483,508 filed on June 27, 1974, in the name of Gerald E. Kunkle and entitled "Manufacture of Glass."

BACKGROUND OF THE INVENTION

1. Field of the Invention

This invention relates to a method of and device for controlling the temperature of molten glass and/or a glass ribbon moving through a forming chamber of the type having molten metal. More particularly, the invention relates to the use of improved lateral and longitudinal dam barriers positioned in the molten metal at selected locations to control longitudinal and lateral convection currents, respectively in the molten metal.

2. Discussion of the Prior Art and Technical Problems

The advantages of dam barriers in the glassmaking art have been recognized. For example, in U.S. Pat. No. 789,911 granted to Hitchcock, there is disclosed a glassmaking process in which a molten metal or liquid bed contained in a tank is divided into a series of compartments by stationary partitions or dam barriers. The partitions extend from the bottom of the tank to the surface of the liquid bed. In successive compartments, there is provided a metal or metal alloy having successively lower melting points. The molten metal in the compartments is maintained at a selected temperature by way of a heater. In this manner, the glass sheet, as it moves along the molten metal, is gradually cooled or annealed by contact with different portions of the molten metal.

Another type of dam barrier is disclosed in U.S. Pat. No. 3,607,199. Disclosed in the above-mentioned patent is a float process for the manufacture of float glass on a molten metal bath. Physical dam barriers are disposed longitudinally and laterally in the bath in a U-shaped form in plan view so as to form predetermined and separate backflow currents at laterally opposed sides of the glass ribbon being formed. The backflow currents flow from the downstream and progressively cooled end of the molten bath back toward the hottest or upstream end thereof flowing around and through the longitudinal barrier ends as spaced from the upstream end walls of the bath tank. The molten metal re-enters and rejoins the bath flow beneath the glass ribbon at the upstream or glass entering end to become gradually and sufficiently reheated thereby serving to remove a potential cause for affecting irregularities in the flatness of glass.

Still another type of dam barrier is disclosed in U.S. Pat. No. 3,485,617. Disclosed in the above-mentioned patent is an apparatus for the manufacture of flat glass by advancing it over a molten metal bath in ribbon form. One or more buoyant upwardly projecting barriers are provided in the molten metal for obstructing the longitudinal flow of the molten metal in the bath. The barriers are easily depressible by the advancing glass if touched thereby. The barriers also project through the exposed bath surface at the sides of the glass ribbon.

In the manufacture of a continuous glass ribbon by the float process, refined molten glass is normally moved onto a molten metal bath at a glass temperature of about 2,000°F. (1095°C). Within a temperature range of about 1,500°F. to 2,000°F. (815°C. to 1095°C.), the molten glass is in the plastic state and is normally sized. The glass can be sized by (1) permitting the molten glass on the molten bath to reach equilibrium thickness, e.g., about 0.270 inches (0.68 centimeters) and then cooling the glass to provide a dimensionally stable continuous glass sheet or ribbon; or (2) providing coolers about the molten glass to contain the glass in a confined area sufficient to increase the glass thickness and then cooling the glass to provide a dimensionally stable continuous glass sheet or ribbon; or (3) applying outward forces, i.e., attenuating the glass while in the plastic state to increase the glass area and then cooling the glass to provide a dimensionally stable continuous glass sheet or ribbon.

Preferably the glass is sized when the glass temperature is in the upper region of the sizing temperature range, e.g., between about 1,850°F. to 2,000°F. (1010°C to 1095°C). This is because the glass is sufficiently plastic from edge-to-edge to permit increasing or decreasing the ribbon thickness from equilibrium thickness. More particularly, if the glass temperature is in the lower region, e.g., between about 1,500°F. to 1,850°F. (815°C. to 1010°C.) the glass can have different degrees of plasticity from edge-to-edge. When this condition exists and the glass is attenuated, the resulting glass ribbon will have strain lines which make the resulting glass ribbon optically unacceptable.

As the glass is cooled through the lower region of the sizing temperature range, it is recommended that the dropping of the temperature be steady and controlled. When this is so, the glass will be uniformly cooled throughout its mass. More particularly, it is preferred that the glass temperature drop is gradual to prevent uneven cooling of the glass surfaces that can cause optical distortion.

As can be appreciated by those skilled in the art, when glass is attenuated or compressed, the glass is normally maintained in the upper region of the sizing temperature range for a longer period of time. For example, when attenuating glass, the attenuation must be graduated to prevent strain lines in the glass ribbon which causes optical defects.

In the conventional float process for manufacturing glass such as disclosed in U.S. Pat. No. 3,083,551, the problem of achieving the criteria for manufacturing glass ribbons of different thickness, e.g., a glass ribbon of equilibrium thickness and a glass ribbon having a thickness greater than or less than equilibrium thickness is not a problem. This is because the float chamber normally has a length as measured from the feed end to the exit end of approximately 200–240 feet (61–73 meters).

Since the float chamber has a length of greater than about 200 feet (61 meters) stationary dam barriers or passive dam barriers are acceptable. This is because the stationary dam barriers provide discrete compartments of molten metal on which heaters act to control the temperature of the molten metal in the compartments. When glass ribbons of thickness less than equilibrium thickness are to be manufactured, a selected number of compartments greater than the number of compartments for manufacturing glass ribbons of equilibrium thickness are maintained at the upper region of the sizing temperature range to permit gradual attenuation of the glass ribbon. The temperature of the remaining compartments are adjusted to provide a gradual, steady and controlled lowering of the temperature through the lower region of the sizing temperature range.

Although fixed dam barriers can advantageously be used in the float process of the type disclosed in the above-mentioned U.S. Pat., there are limitations when using passive dam barriers in glassmaking process where the forming chamber has length of about 10 feet (3 meters). Such a process, for example, is disclosed in U.S. Pat. application Ser. No. 483,508 filed on June 27, 1974, in the name of Gerald E. Kunkle and entitled "Manufacture of Glass."

The manufacture of glass as disclosed in above-mentioned Kunkle application includes delivery of molten glass onto the surface of a pool of molten metal and monotonically cooling the molten glass while attenuating same to form a dimensionally stable, continuous sheet of glass. The dimensionally stable, continuous sheet of glass is then lifted upward and conveyed vertically upwardly from the pool of molten metal. The glass is further monotonically cooled until it is below the annealing point for the glass. The glass is cooled in such a manner that at the time of its lifting from the molten pool of metal, it is sufficiently viscous to prevent its further attenuation while being conveyed upwardly and its major surface temperatures are sufficiently equalized so that permanent stresses are avoided in the glass.

The distance between the entrance end of the forming chamber to move the molten glass into the forming chamber and the liftoff position to vertically convey the sheet of glass upward from the pool of molten metal is preferably less than about 100 inches (2.54 meters). Using fixed dam barriers in the forming chamber are adequate to manufacture glass ribbons of one thickness. However, because the distance which the glass travels prior to liftoff is relatively short using fixed dam barriers, i.e., controlling the molten glass in compartments by coolers, has limitations. For example, merely controlling the temperature of the molten metal in the compartments with coolers does not provide adequate flexibility for maintaining the glass within the upper region of the sizing temperature range for the required period of time when changing from thick glass ribbon, e.g., glass ribbons having a thickness of about 0.270 inches (0.68 centimeters) to thin glass ribbon, e.g., glass ribbon having a thickness of about 0.100 inch (0.254 centimeters) or less or vice versa.

More particularly, when the process as described in the above-mentioned Kunkle application is employed for manufacturing flat glass of equilibrium thickness using stationary dam barriers of the type taught in the prior art, a change to manufacturing flat glass of less than equilibrium thickness requires a shutting down of the process. This is because the floor in the forming chamber has to be modified to reposition the stationary dams to manufacture flat glass having a thickness less than equilibrium thickness.

As can be appreciated, shutting down the glassmaking process is expensive because no glass is produced and because of the labor required to modify the floor of the forming chamber.

It would therefore be advantageous if dam barriers were provided that did not have the limitation of the passive dam barriers of the prior art.

SUMMARY OF THE INVENTION

This invention relates to an improved method of producing a continuous ribbon of flat glass. The method includes the steps of providing a layer of molten glass on the surface of a pool of supporting molten metal and advancing the layer of glass along the surface of the pool of molten metal. The temperature of the layer of glass is controlled to cool the layer of glass to form a dimensionally stable ribbon of flat glass of a specified thickness. At least a portion of the cooling of the advancing layer of glass is by transfer of heat to the molten metal. The improvement includes the step of positioning movable dam barriers in the molten metal to change the pattern of heat removal from the layer of glass.

In one embodiment at least one of the dam barriers has reciprocal movement along a path generally parallel to the advance of the layer of glass. Moving the at least one dam barrier along the reciprocating path alters convection currents in the molten metal to change the pattern of heat removal from the layer of glass.

In an alternate embodiment at least one of the dam barriers has reciprocal movement toward and away from the layer of glass to increase or decrease the number of convection currents in the molten metal. In this manner, the pattern of heat removal from the layer of glass may be changed.

In still another embodiment at least two dam barriers have reciprocal movement along a path transverse to the advance of the layer of glass. Movement of the at least two dam barriers along the reciprocating path transverse to the advance of the layer of glass alters convection currents in the molten metal to change the heat removal pattern between edges of the layer of glass.

This invention further relates to a method of changing the thickness of a continuous ribbon of flat glass during production thereof. The glass ribbon is produced by providing a layer of molten glass on the surface of a pool of supporting molten metal. The temperature of the glass is adjusted and maintained at a plurality of discrete compartments along the glass path such that the glass temperature at each of the plurality of discrete compartments is less than the glass temperature at the next previous discrete compartment and greater than the glass temperature at the next succeeding discrete compartment to cool the layer of glass to provide a continuous glass ribbon of a specified thickness. At least a portion of the cooling of the advancing layer of glass is by the transfer of heat to the molten metal. Thereafter the ribbon is removed from the pool of molten metal. The method includes the step of providing movable dam barriers in the molten metal to define the discrete compartments and positioning the dam barriers in the molten metal to change the pattern of heat removal from the layer of glass.

This invention also relates to an improved apparatus for making flat glass. The apparatus is of the type having a glass melting furnace for supplying molten glass for forming and a glass forming chamber having a bottom and side portions for containing a pool of supporting molten metal. A delivery facility connects the exit end of the furnace and entrance end of the forming chamber for moving the molten glass from the furnace to the forming chamber to provide a layer of molten glass on the pool of supporting molten metal. The molten glass as it advances along the molten metal is cooled to form a continuous glass ribbon of a specified thickness with at least a portion of the cooling being by transfer of heat to the molten metal. Facilities are also provided for continuously removing the glass ribbon from the forming chamber. The improvement includes movable dam barriers mounted on the bottom of the forming chamber.

In one embodiment the dam barriers each include a roll body made of molybdenum or an alloy of molybdenum and tungsten covered with an asbestos cloth. A plate is advantageously mounted to the roll body to prevent movement of the roll body in the molten metal.

BRIEF DESCRIPTION OF THE DRAWING

FIG. 3 is a graph showing the preferred temperature profile for glass ribbons of different thickness moving through a forming chamber;

FIG. 4 is a cross-sectional longitudinal view of a forming chamber having stationary dam barriers;

FIG. 5 is a graph showing the temperature profile of glass ribbons of different thickness moving through the forming chamber of FIG. 4;

FIGS. 6 and 8 are each a cross-sectional longitudinal view of a forming chamber using dam barriers incorporating features of the invention for practicing the invention;

FIGS. 7 and 9 are each a graph showing the temperature profile of a glass ribbon as it moves through the forming chambers of FIGS. 6 and 8 respectively;

FIGS. 15–20 are illustrations of various embodiments of dam barriers incorporating features of the invention for practicing the invention.

DESCRIPTION OF THE INVENTION

Figure 1:
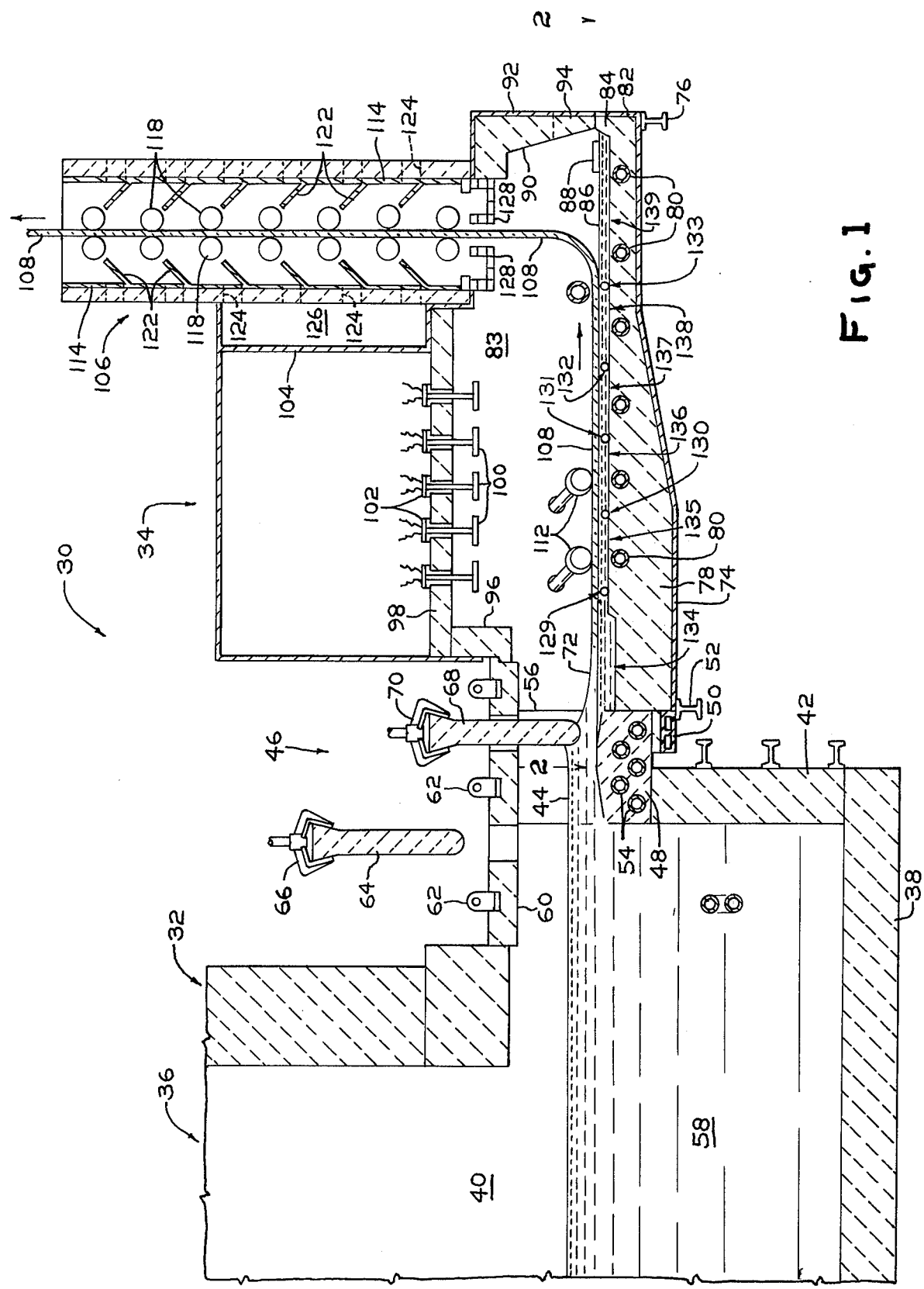
FIG. 1 is a sectional elevation of a glassmaking apparatus that may be used for practicing the invention.

Referring to FIG. 1, there is shown a glassmaking apparatus of the type disclosed in U.S. Pat. application Ser. No. 483,508 filed on June 27, 1974, in the name of Gerald E. Kunkle and entitled "Manufacture of Glass." The teachings of the above-identified application are hereby incorporated by reference. As will be appreciated, the invention is not limited to the glassmaking apparatus of the above-mentioned application and has applicability in conventional float processes as well as the manufacture of glass disclosed in U.S. Pat. No. 3,843,346 granted to Charles K. Edge and Gerald E. Kunkle.

Figure 2:
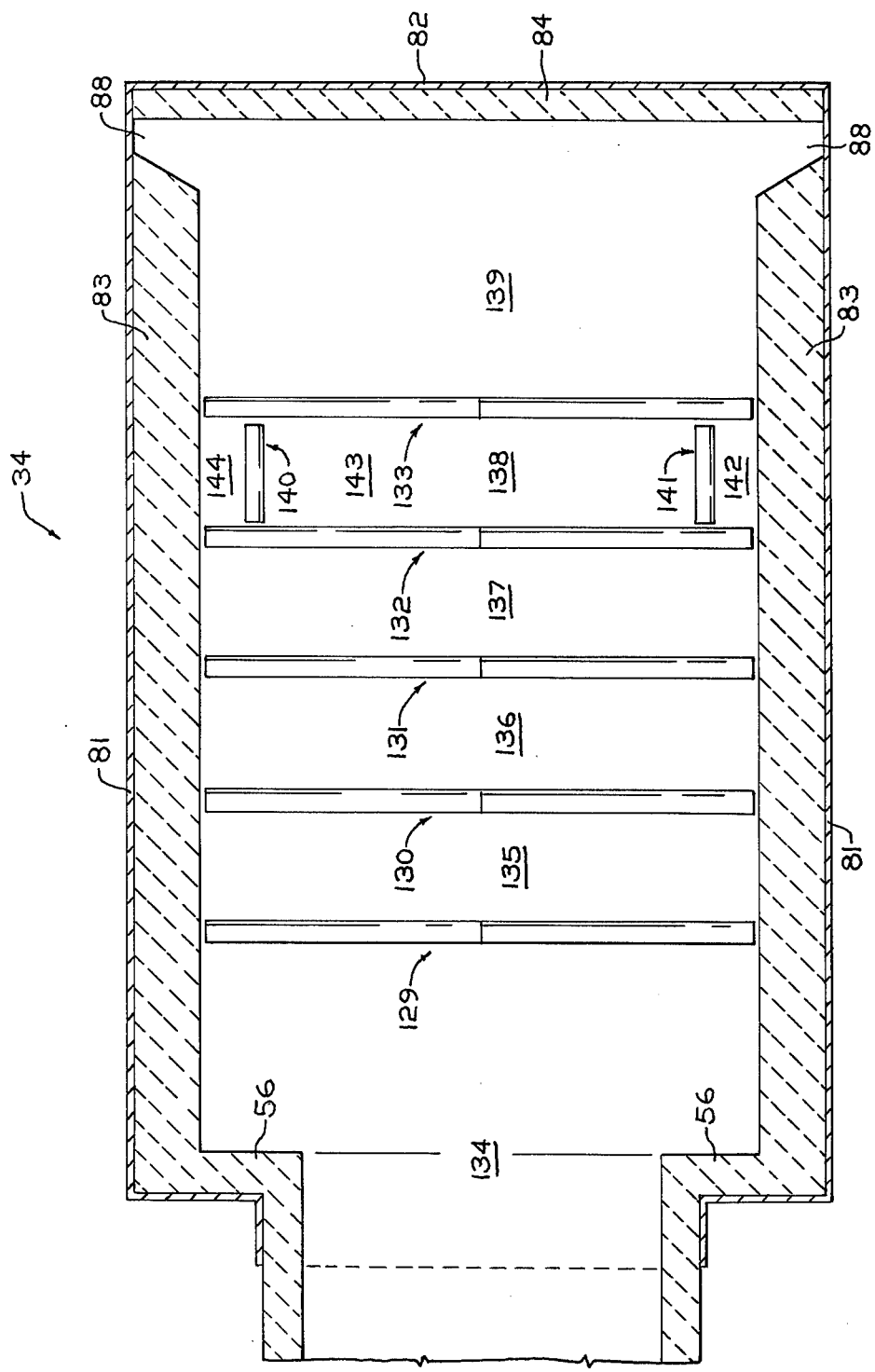
FIG. 2 is a view taken along lines 2—2 of FIG. 1 showing the forming chamber and having portions removed for purposes of clarity.

In FIG. 1, the glassmaking apparatus 30 includes a glassmaking furnace 32 and a forming chamber 34 (see also FIG 2). The glassmaking furnace 32 includes a melting section (not shown) and a refiner or conditioning section 36, the end of which is shown. The refiner section 36 of the furnace 30 includes a furnace bottom 38 and sidewalls 40 and a front basin wall 42. The conditioning section 36 of the furnace delivers molten glass 44 to the forming chamber 34 by way of delivering facility 46.

In general, the delivery facility 46 includes a threshold 48 resting on a cooling block 50 or other support which is supported by structural member 52. Extending through holes in the threshold 48 are conduits or pipes 54 for transporting coolant or the like through the interior of the threshold 48 and for controlling its temperature during use. At the ends of the threshold 48 there are sidewall portions or jambs 56 which define the size of the channel through which the molten glass may be delivered from a pool of molten glass 58 residing in the bottom portion of the conditioning section 36 of the furnace 32.

The top of the delivery facility 46 is defined by a roof 60 generally of flat arch construction which is supported by supporting facilities (not shown). Extending above the roof 60 and connected to it are flat arch holders 62 embedded in the roof 60 of the delivery facility 46. Extending transversely across the delivery facilities 46 are two gates or tweels. The first is a backup tweel 64 connected to a support facility 66 (not fully shown) for raising and lowering the tweel 64 into engagement with the molten glass 44. The second tweel is a control tweel 68 supported by a support assembly 70 (not fully shown) for raising and lowering the control tweel 68. The control tweel 68 is held in operating position in contact with the molten glass 44 to be delivered into the forming chamber 34 for forming. The control tweel 68 along with the threshold 48 and the jambs 56 defines an opening through which a layer of molten glass 72 may be delivered to the forming chamber 34 for forming.

The forming chamber 34 includes a bottom casing 74 supported on a support 76 in addition to the support 52. Disposed within the bottom casing 74 is a refractory bottom 78 preferably a refractory bottom that has been cast in place inside the bottom casing 74. Preferably embedded within the bottom refractory 78 are pipes 80 through which coolant or other fluid may be directed for controlling the temperature of the forming chamber 34 at discrete locations along its length.

Referring to FIGS. 1 and 2, the forming chamber 34 further includes side casing 81 and an exit casing 82. Disposed within the side casing 81 and exit casing 82 are refractory sidewalls 83 and a refractory exit lip 84, respectively. The sidewalls 83, refractory exit lip 84, along with the bottom refractory 78, and the threshold 48, define a container into which a molten pool of metal 86 (shown in FIG. 1) preferably molten tin or an alloy of tin is disposed. At the downstream end of the forming chamber 34 there are provided extensions 88 in the bottom container portion of the forming chamber which serve as cavities into which dross floating on the surface of the molten metal 86 may be withdrawn for removal from the forming chamber 34.

Referring now to FIG. 1, the upper portion of the forming chamber 34 includes an end wall liner 90 preferably constructed of refractory material. This liner 90 and end casing 92 to which it is connected may include a suitable opening 94 through which a continuous sheet of glass may be withdrawn from the forming chamber 34 along a substantially horizontal path in the event that such removal is desired. Generally, however, during the glass forming operation, such an opening will be closed and sealed as shown.

The upper portion of the chamber 34 further includes a lintel 96 at its upstream or inlet end. This lintel 96 may be used as a means for supporting the roof 60 of the delivery facility 46. Additionally, the upper portion of the forming chamber 34 includes a ceiling or roof 98 preferably made of a refractory material which is suitable for radiating and absorbing heat uniformly over the area facing the glass beneath it during operation. Extending through the ceiling 98 of the forming chamber are controllable heating elements 100 used to control the rate of heat removal from the glass during forming. The heating elements 100 are connected to bus bars 102 which are advantageously connected in turn to a source of power (not shown) such as the type known in the art. The upper portion of the forming chamber 34 preferably includes a top casing end wall 104 which provides a space between the upper portion of the forming chamber 34 and the upstream or furnace side of a conveyor mechanism 106 for vertically withdrawing a sheet of glass 108 from the forming chamber 34.

The continuous sheet of glass 108 is formed from the layer of molten glass 72 delivered onto the pool of molten metal 86 for forming. The glass is preferably formed and delivered in the manner described in the above-mentioned U.S. Pat. No. 3,843,346. However, as will be appreciated, the glass may be delivered and formed in any conventional manner such as for example the manner described in U.S. Pat. Nos. 3,083,551 and 3,220,816.

Extending into the forming chamber 34 through its sidewalls 82 are edge contact devices 112 for applying outward tractive forces to the layer of glass 72 during its advance along the surface of the pool of molten metal 86 for forming. The edge contact devices which attenuate the glass, i.e., apply outward tractive forces are of the type known in the art.

The edge contacting devices 112 are preferably driven wheels disposed and driven in such a manner as to apply opposing outward forces to the glass to maintain its width during attenuation and to cause it to be attenuated to thicknesses less than that which would be attained by the glass if allowed to remain on the surface of the molten metal for sufficient time to come to equilibrium with it, e.g., a thickness of about 0.270 inches (0.68 centimeters).

The vertical conveyor 106 includes a machine casing 114 and thermally insulated machine walls 116. The machine walls 116 are preferably constructed of a refractory material. Within the conveyor there is disposed a series of pairs of supporting rolls 118 operated in a coordinated manner for engaging the continuous sheet of glass 108 and for conveying it upwardly through the conveyor 106 in any conventional manner. Extending from the machine casing 114 toward the rolls are a series of pairs of troughs 122 for collecting cullet in the event the continuous sheet of glass 108 is chipped or broken in an upper portion of the conveyor. The cullet may be removed from the troughs 122 through openings 124. In normal operations, the openings 124 are closed. A space or cullet chamber 126 is provided between the top casing end wall 104 of the forming chamber 34 and the wall of the vertical conveyor for accommodating cullet removal.

Preferably coolers 128 are disposed across the bottom of the vertical conveyor 106 to control the removal of heat from the continuous sheet of glass 108 as the sheet is conveyed upwardly from the surface of the pool of molten metal 86 in the forming chamber 34.

Referring now to FIGS. 1 and 2, the interior of the forming chamber 34 is provided at selected intervals with lateral dam barriers or weirs 129, 130, 131, 132, and 133. The lateral dam barriers preferably extend between sidewalls 83 of the forming chamber 34 to provide discrete longitudinal compartments 134, 135, 136, 137, 138 and 139 (shown better in FIG. 2) of molten metal which control the temperature of the molten glass 72 and/or glass ribbon 108 as it moves over the compartments in a manner to be discussed below.

Referring specifically to FIG. 2, positioned between the lateral dam barriers, e.g., lateral dam barriers 132 and 133 and spaced from the sidewalls 83 are longitudinal dam barriers 140 and 141 to divide the compartment 138 into discrete lateral compartments 142, 143 and 144 of molten metal. The lateral compartments control the edge-to-edge temperature profile of the molten metal and/or the glass ribbon as it moves over the lateral compartments in a manner to be discussed below.

The dam barriers are preferably submerged below the top surface of the molten metal bath 86 (see FIG. 1) to prevent surface contact between the dam barriers and glass which can degrade the optical quality of the subsequently formed glass ribbon and cause drag on the glass ribbon.

As will be appreciated, the number of dam barriers employed and their respective positions in the forming chamber and to one another are not limiting to the practice of the invention.

The discussion will now be directed to the effect of the prior art lateral dam barriers, i.e., fixed lateral dam barriers and the lateral dam barriers incorporating features of the invention, i.e., movable lateral dam barriers. The term "fixed lateral dam barrier" as used herein is defined as dam barriers securely positioned between sidewalls of the forming chamber to provide discrete compartments of molten metal so that coolers and/or heaters can act on the molten metal to control the temperature of the molten metal in the compartments. The term "movable lateral dam barrier" as the term is used herein are dam barriers positioned between the sidewalls of the forming chamber and (1) are longitudinally movable, i.e., upstream and downstream in the forming chamber and/or (2) vertically movable, i.e., toward and away from the surface of the molten metal in the forming chamber. The movable lateral dam barriers are adjusted, e.g., longitudinally and/or vertically to control the temperature gradient of the glass extending from the downstream end, e.g., the feed end to the exit end or the liftoff end of the forming chamber. The temperature gradient of the glass is controlled by controlling the convection currents in the molten metal bath and/or by the coolers in a manner to be discussed below.

To simplify the following discussion of the operation of the lateral dam barrier to control the temperature gradient of the glass, it is assumed that (1) the controllable heating elements 100 shown in FIG. 1 are adjusted to provide heating zones of successively decreasing temperature with the hottest heating element at the upstream end of the forming chamber 34, i.e., closest to the threshold 48 and (2) that each of the controllable heating elements are set at a predetermined temperature that is changed accordingly to maintain the glass at a preselected temperature. As can be appreciated by those skilled in the art, the following conditions are acceptable and do not alter or render invalid the following discussion. This is because the heating elements 100 are used as auxiliary heating and/or cooling facilities. More particularly, as the molten glass moves into the forming chamber, heat is radiated from the molten glass into the forming chamber and through the walls of the forming chamber. The controllable heating elements 100 provide a sufficient amount of heat until the interior portion of the forming chamber above the glass is at the preselected temperature at which time the molten glass moving past a zone of a controllable heater will not dissipate any more heat into the upper portion of the forming chamber as viewed in FIG. 1.

Referring to FIG. 3, there is shown a graphic illustration of a typically preferred temperature profile for a glass ribbon of equilibrium thickness (curve 150) and for a glass ribbon having a thickness of less than equilibrium thickness (curve 152) manufactured in accordance to the teaching of the above-identified Kunkle application. It is noted that for glass thickness of less than equilibrium thickness, curve 152, the glass remains in the upper region of the sizing temperature range for a longer distance, i.e., for a longer period of time when the ribbon speed is constant as the ribbon moves through the forming chamber. This is to permit gradual attenuation of the glass ribbon to a thickness of less than equilibrium thickness.

Preferably, the glass is sized when the glass temperature is in the upper region of the sizing temperature range, e.g., between about 1,850°F. to 2,000°F. (1010°C. to 1093°C.). This is because the glass is sufficiently plastic from edge-to-edge to permit increasing or decreasing the ribbon thickness from equilibrium thickness. More particularly, if the glass temperature is in the lower region, e.g., between about 1,500°F. to 1,850°F. (816°C. to 1010°C.) the glass can have different degrees of plasticity from edge-to-edge. When this condition exists and the glass is, for example, attenuated, the resulting glass ribbon will have strain lines which make the resulting glass ribbon optically unacceptable.

With continued reference to FIG. 3 the temperature profile of the glass ribbon represented by the curve 150 and the glass ribbon represented by the curve 152 within the lower region of the sizing temperature range have substantially the same shape, e.g., the same slope.

As can be appreciated by those skilled in the art, as the glass is cooled through the lower region of the sizing temperature range, it is preferred that the temperature decline be gradual, steady and controlled. This is so the glass will be uniformly cooled throughout its mass. If the glass is cooled rapidly there is uneven cooling which can cause optical distortion in the subsequently formed glass ribbon. Although there is no standard temperature profile for glass passing through the lower region of the sizing temperature range, it is generally acknowledged that the temperature decline should be gradual to permit even cooling of the glass ribbon.

Below the sizing temperature range it is preferred to cool the glass rapidly and uniformly so that the glass can be removed without unnecessary delay from the forming chamber.

Referring now to FIG. 4, there is shown a longitudinal side view of a forming chamber 154 similar to the forming chamber 34 of FIG. 1 but more simplified. The forming chamber 154 includes a back end wall 156, a front end wall 158 mounted on a base or floor 160 to provide a container for containing molten metal 162. Mounted on the floor 160 of the forming chamber 154 and extending toward the surface of the molten metal 162 are dam barriers 164, 165 and 166 of the type used in the prior art to divide the molten metal bath into compartments 168, 169, 170 and 171, respectively. The temperature of the molten metal in the compartments 168, 169, 170 and 171 is controlled by the coolers 172, 173, 174 and 175, respectively, embedded in the bottom 160 of the chamber 158. In each of the compartments 168, 169, 170 and 171 there are longitudinal convection currents 176, 177, 178 and 179, respectively, each having a similar circuitous path direction as shown in FIG. 4.

As the glass moves over the compartments heat is radiated into the upper portion of the forming chamber as previously discussed and heat is extracted from the glass ribbon by the molten metal.

Molten glass 180 is moved over the back end 156 of the forming chamber 154. As the molten glass moves downstream from the back end 156 to the front end 158, the molten glass is monotonically and constantly cooled to provide a glass ribbon 182. The glass ribbon 182 is horizontally withdrawn from the chamber 154 as shown in FIG. 4.

The dam barriers 164, 165 and 166 are spaced a predetermined distance apart and acted on by the coolers 172, 173, 174 and 175 to manufacture glass ribbon having equilibrium thickness. Referring to FIG. 5, curve 184 is typical of the temperature profile of the glass ribbon having equilibrium thickness moving through the forming chamber 158.

Comparing the curve 184 of FIG. 5 to the curve 150 of FIG. 3, it is noted that the curves are generally similar with the exception that the slopes of the curve 184 have accentuated changes in slope. This is due to the effect of the dam barriers which generally provide an accentuated change in the temperature profile curve as the glass ribbon moves downstream over to the next succeeding compartment.

Consider now the temperature profile curve in the instance where the cooler 173 is adjusted to extract less heat to produce a glass ribbon having a thickness less than equilibrium thickness. As previously mentioned, the glass is preferably held in the upper region of the sizing temperature range for a longer period of time to permit gradual attenuation of the glass. To accomplish this using prior art dam barriers, the cooler 173 acting on compartment 177 extracts less heat, and coolers 172, 174 and 175 extract the same amount of heat as for producing a glass ribbon of equilibrium thickness.

As shown by the curve 186, the effect of extracting less heat by compartment 169 provides the curve 186 with an upper region temperature profile similar to the upper region temperature profile of the curve 152 which is desirable for attenuation. This is because the attenuation of the glass can be performed gradually while the glass is in the upper region of the sizing temperature range.

Attention is now directed to the slope of the temperature curve 186 as the glass passes over the compartment 170. Comparing the slope of the curve 186 in the lower region of the sizing temperature range to the slope of the curve 152 of FIG. 3 for the same region it can be seen that the curve 186 has a steeper slope. This indicates that the glass ribbon is rapidly cooled. This rapid cooling of the glass is not desirable because, as previously mentioned, rapid cooling of the glass through the lower region of the sizing temperature range does not permit gradual, even cooling of the glass.

There are provisions that can be made to maintain the glass within the lower region of the sizing temperature range for a longer period of time but these have limitations. For example, the speed of the ribbon can be reduced to maintain the glass within the sizing temperature for a longer period of time. This is not desirable because it reduces output. Another alternative is to increase the number of fixed lateral dam barriers in the chamber. This is not desirable because it increases the cost of fabricating the chamber. Still further to install fixed lateral dam barriers the glassmaking process has to be shut down to reposition the dam barriers. This is not desirable because of reduced output and labor costs to accomplish the repositioning of the dam barriers.

All of the above limitations are obviated using the movable dam barriers of the invention in a manner now to be discussed. With reference to FIG. 6, there is shown a forming chamber 190 similar to the forming chamber 154 of FIG. 4 with the differences now to be discussed. The forming chamber 190 is provided with movable dam barriers 192, 194 and 196 constructed in accordance to the teachings of the invention; more particularly, the dam barriers 192, 194 and 196 are movable toward and away from the top surface of the molten metal bath 162. A plurality of grooves 197 are provided in the floor 160 of the forming chamber 190 to receive a respective dam barrier as it is moved away from the surface of the molten metal bath in a manner to be discussed, infra.

In the arrangement selected for this discussion, the dam barriers 194 and 196 are extended their full length out of their respective grooves 197 to a position spaced from the surface of the molten metal 162 similar to the position of the passive dam barriers 165 and 166 of FIG. 4 to provide compartments 198 and 200, respectively. Longitudinal convection currents 202 and 204 in the compartments 198 and 220, respectively, of the forming chamber 190 shown in FIG. 6 are similar to the convection currents 178 and 179 in the compartments 170 and 171 of the forming chamber 154 shown in FIG. 4.

The active dam barrier 192 is partially recessed in its respective groove 197 spaced a greater distance from the top surface of the molten metal 162 than the dam barrier 164 of FIG. 4. With this arrangement, there is provided a compartment 206 between the dam barriers 192 and back end 156; a compartment 208 between the dam barriers 192 and 194; and a compartment 210 between the back end 156 and the dam barrier 194 above the top end of the dam barrier 192 as viewed in FIG. 6. In the compartments 206, 208, and 210, there are convection currents 212, 214 and 216, respectively.

The temperature of the molten metal in compartment 206 is controlled by the cooler 172; the temperature of the molten metal in compartment 208 by the cooler 173; and the temperature of the molten metal in compartment 210 by coolers 172 and 173. As can now be appreciated, as the dam barrier 192 is further lowered into its respective groove 197, the size of the compartment 210 increases as the size of the compartments 206 and 208 decrease. The result is to further blend the molten metal in compartments 206 and 208 so that cooling of the glass provides a temperature profile that has no abrupt change as the glass passes over the compartment 210.

In practice, the forming chamber 190 of FIG. 6 is operated as was the forming chamber 154 of FIG. 4 for producing glass ribbon of equilbrium thickness. To produce glass thickness of less than equilibrium thickness, the dam barrier 192 is lowered into its respective groove 197. The coolers 173 of the forming chamber 190 does not have to be readjusted to extract less heat as was the cooler 173 of the forming chamber 154. This is because the molten metal in the chamber 206 blends with the molten metal in the chamber 208. The blending occurs in the chamber 210.

Although the discussion has not considered the effect of extracting more or less heat by the coolers embedded in the floor 160 of the forming chamber 190, it is within the teachings of the invention to combine lowering the dam barriers with changing heat extraction by the coolers. As can now be appreciated by those skilled in the art, the effect of extracting more heat tends to lower the temperature of the glass while extracting less heat tends to raise the temperature of the glass with all other parameters remaining constant.

With reference to FIG. 7, curve 218 is a typical temperature profile of a glass ribbon moving through the forming chamber 190 arranged per the above discussion.

The overall effect of lowering the dam barrier 192 is to maintain the glass ribbon in the upper region of the sizing temperature range for a longer period of time with a smooth transition to decreasing temperature. The glass ribbon at dam barrier 194 is approximately the same temperature as was the temperature of the glass ribbon of equilibrium thickness at dam barrier 194. With this arrangement and as shown in FIG. 7, the glass can be gradually attenuated while in the upper region of the sizing temperature range and thereafter gradually, steadily and constantly cooled through the lower region of the sizing temperature range to prevent optical distortion in the subsequently formed glass ribbon.

The discussion will now be directed to an alternate embodiment of the invention for changing the temperature profile of glass moving through a forming chamber to change from producing glass ribbon having equilibrium thickness to a glass ribbon of less than equilibrium thickness or vice versa.

Referring now to FIG. 8, there is shown a forming chamber 220 similar to the forming chamber 190 of FIG. 6 with the differences now to be discussed. In place of the vertically movable dam barrier 192, there is provided a longitudinally movable dam barrier 222 for movement toward and away from the end wall 156. The distance of the dam barriers 222, 194 and 196 from the surface of the molten metal 162 is the same and equal to the distance between the dam barriers 194 and 196 as positioned in FIG. 6 for the previous discussion. Between the dam barriers 222 and 194 and between the dam barrier 222 and end wall 156 is compartment 224 and 226, respectively.

The volume of molten metal in the compartments 224 and 226 vary as a function of position of the dam barrier 222. As illustrated in FIG. 8, the dam barrier 222 is moved closer ro the dam barrier 194 than was the dam barrier 192 of FIG. 6.

Shown in the compartment 226 is convection current 228 and in the compartment 228 is convection current 230. The temperature of the compartment 224 is controlled by the coolers 172 and by the cooler 173. The temperature of the compartment 226 is controlled by the cooler 173. As can now be appreciated, as the dam barrier 222 is moved closer to the dam barrier 197, the effect cooler 173 becomes more pronounced.

Consider now changing from manufacturing glass of equilibrium thickness to a glass ribbon having a thickness less than equilibrium thickness.

The dam barriers 222, 194 and 196 are arranged similar to the dam barrier 164, 165 and 166 as shown in FIG. 4. The coolers 172, 173, 174 and 175 are arranged to provide a temperature profile for the glass ribbon similar to the curve 184 shown in FIG. 5.

Referring now to FIG. 8, the forming chamber 220 is arranged to manufacture glass ribbon of a thickness less than equilibrium thickness by longitudinally displacing the dam barrier 222 downstream, i.e., away from the end wall 156.

With reference to FIG. 9, there is shown curve 232 which is a typical profile of a glass ribbon as it moves through the forming chamber arranged as shown in FIG. 8. It can be seen from the curve that the glass remains in the upper region of the sizing temperature for a sufficient period of time to gradually attenuate the glass ribbon. Thereafter the glass ribbon while passing through the lower region of the sizing temperature range is gradually, steadily and controllably cooled to prevent optical distortion in the subsequently formed glass ribbon.

As can now be appreciated by those skilled in the art, other embodiments of lateral dam barrier arrangements can be made and are contemplated by the scope of the invention. For example, more than one dam barrier can be longitudinally moved in the chamber. Still further, more than one dam barrier can be lowered in its respective groove to reposition the dam barrier in spaced relation to the surface of the molten metal. Still further, the dam barriers may be arranged such that the distance from the top of the dam to the top surface of the molten metal is different for each dam barrier.

As can now be appreciated, using dam barriers of the invention, e.g., movable dam barriers, the problems encountered with the prior art dam barriers are eliminated. This is because the dam barriers of the invention (1) can be used in cooperation with coolers, (2) maintain the glass within the sizing temperature range, e.g., the upper region of the sizing temperature range for a sufficient period of time to gradually increase or decrease the glass ribbon thickness from or to equilibrium thickness and (3) provide for gradual, steady and uniform cooling of the glass ribbon as the glass ribbon is cooled through the lower region of the sizing temperature range.

The discussion will now be directed to the longitudinal dam barriers of the invention which act upon lateral convection currents.

Figure 10:
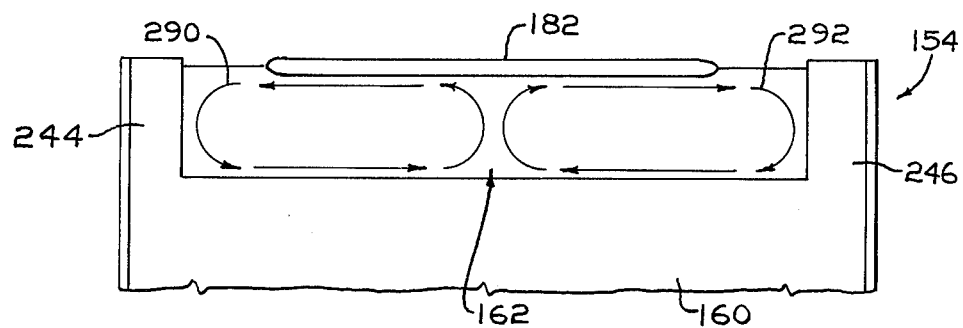
FIG. 10 is a lateral cross-section view of a prior art forming chamber.

With reference to FIG. 10, there is shown a lateral, cross-sectional view of the forming chamber 154 of FIG. 4. In the molten metal 162 there are convection currents 240 and 242 which move along their circuitous path in opposed directions. The lateral convection current 240 follows a path below and adjacent the surface of the molten metal 162 from the center of the bath toward adjacent sidewall 244 down the sidewall and along the bottom of the forming chamber toward the center and up toward the surface of the molten metal 162. The lateral convection currents follow a path below and adjacent the surface of the molten metal 162 from the center of the bath toward adjacent sidewall 246 down the sidewall and along the bottom of the forming chamber toward the center and up toward the surface of the molten metal 162.

Figure 11:
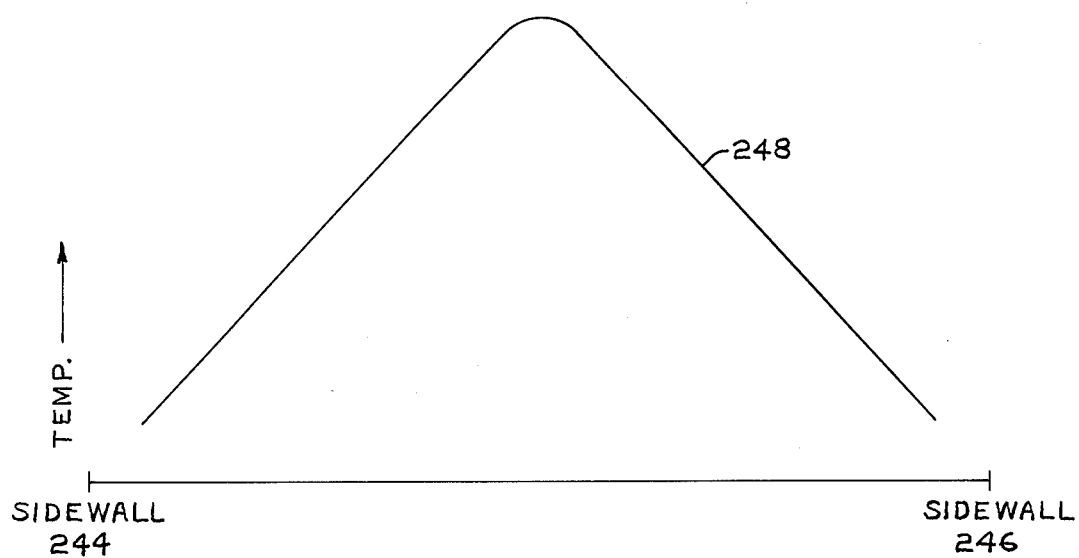
FIG. 11 is a graph showing the edge-to-edge temperature of a glass ribbon moving through the forming chamber of FIG. 10.

Referring to FIG. 11, there is a curve 248 typical of the edge-to-edge temperature of the glass ribbon 182 passing through a uniformly heated roof, for example, prior to lift-off. As the distance from the sidewall 244 increases toward the center, the temperature increases and as the distance further increases toward the opposite sidewall 246, the temperature decreases approximately at the same rate as the temperature increases to provide a generally bell-shaped curve.

Figure 12:
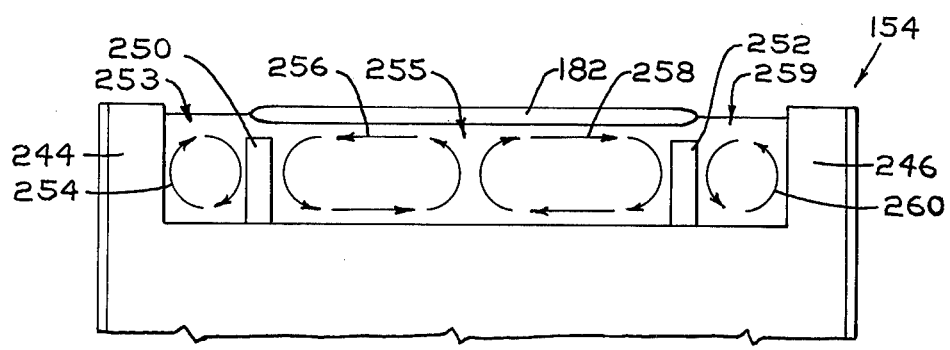
FIG. 12 is a lateral cross-sectional view of a forming chamber using dam barriers incorporating features of the invention to practice the invention.

Referring now to FIG. 12, there is shown the forming chamber 154 provided with a pair of longitudinal dam barriers 250 and 252. Dam barrier 250 is spaced from the sidewall 244 and the dam barrier 252 is spaced from the sidewall 246. It will be noted that instead of the two lateral convection currents 240 and 242 as shown in FIG. 10, that there are now four convection currents; namely, convection current 254 between the sidewall 244 and the dam barrier 250, i.e., in compartment 253; between longitudinal dam barrier 250 and 252, i.e., in compartment 255 there are convection currents 256 and 258 similar to the convection currents 240 and 242 shown in FIG. 11 but having a smaller path; and between the dam barrier 252 and adjacent sidewall 246, i.e., in compartment 259 there is convection current 260.

Figure 13:
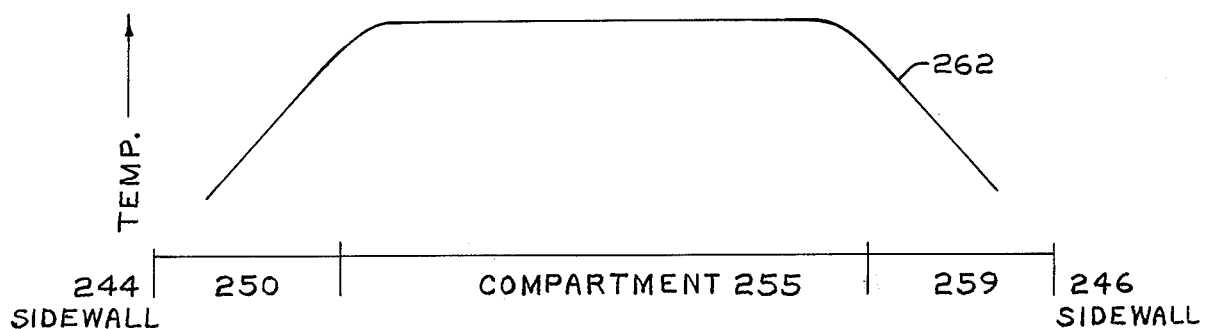
FIG. 13 is a graph showing the edge-to-edge temperature of a glass ribbon moving through the forming chamber of FIG. 12.

Referring to FIG. 13, there is shown a curve 262 typical of the temperature profile of the glass ribbon as it moves over the compartment 253. In comparing the curve 262 in FIG. 13, with the curve 248 in FIG. 11, it will be noted that the curve 262 has a more uniform temperature distribution in the compartment 253 and a greater temperature gradient in compartments 255 and 257 for corresponding portions of the curve 248 (FIG. 11).

This change, i.e., flattening of the curve, is attributed to the fact that the effect of heat loss through the sidewalls on the molten metal in compartment 255 is negligible. Therefore the temperature profile is more uniform.

As can now be appreciated, as the dam barriers 250 and 252 are displaced toward each other and spaced an increased distance from their adjacent sidewalls with all the other parameters remaining constant, the portion of the curve reflecting the temperature profile of the molten metal between the dam barriers becomes more flat, i.e., the temperature is more uniform. Further, as the dams are moved farther apart and all the other parameters remain constant the shape of the curve approaches that of curve 248 in FIG. 11.

Further as now can be appreciated, lowering the dam barriers 250 and 252 all the other parameters remaining constant, the curve 262 approaches the shape of the curve 248 of FIG. 11.

Although the discussion was directed to longitudinal dam barriers that are below the surface of the molten metal it is within the scope of the invention to have the longitudinal dam barriers extend out of the molten metal adjacent edges of the glass ribbon moving through the forming chamber.

As can now be appreciated, the invention is not limited to the number of lateral dams used or their position relative to the sidewalls. For example, and with reference to FIG. 14, there is shown various embodiments of lateral dam barriers positioned in the forming chamber 34.

Figure 14:
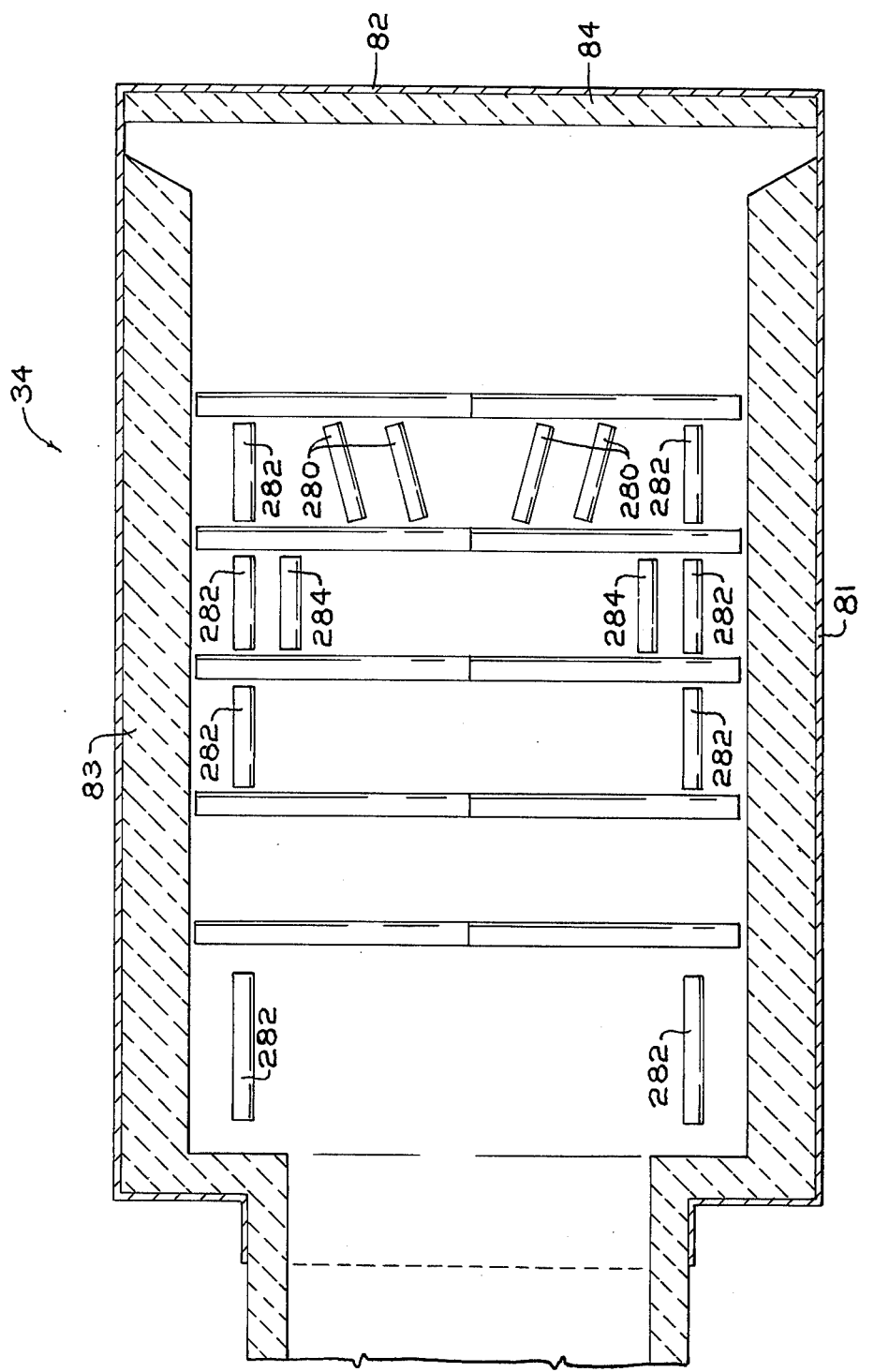
FIG. 14 is a view of a forming chamber, the forming chamber similar to that of FIG. 2 illustrating various positions of dam barriers incorporating features of the invention for practicing the invention.

The dam barriers may be angled toward each other as are dam barriers 280 shown in FIG. 14 in an upstream direction. Dam barriers may be provided along the length of the forming chamber 34 as are dam barriers 282 shown in FIG. 14. Further more than one dam barrier may be provided adjacent a sidewall as are dam barriers 282 and 284 shown in FIG. 14.

In the conventional float process for manufacturing glass longitudinal dams were employed at the hot end of the forming chamber to provide a temperature gradient for removing potential cause for affecting irregularities in the flatness of the glass. For example, reference may be made to U.S. Pat. No. 3,607,199.

in the glassmaking process as disclosed in U.S. Pat. application Ser. No. 483,584, the glass is vertically removed from the molten metal and pulled upwardly. The importance of maintaining a uniform temperature from edge-to-edge of the glass can best be appreciated by the following example. If the temperature between the edges is hotter than at the edges, as the glass is pulled the center portion of the ribbon tends to sag which optically distorts the glass. Maintaining the temperature uniform across the ribbon as it is vertically pulled provides a uniform distribution of forces which does not affect the optical quality of the glass.

The discussion will now be directed to various types of dam barrier construction that may be used in the practice of the invention. However, as can now be appreciated, the dam barrier structures to be discussed as merely illustrative of those that may be used and the invention is not limited thereto.

Referring to FIGS. 15 and 16 there is shown a dam barrier 300 which includes a cylindrical body 302 having a flat 304 or other expediencies such as legs to prevent the dam from rolling in the forming chamber 34. The body 302 and flat 304 are preferably made of a material that is non-reactive with the molten metal. For example, in the instance where the molten metal bath is tin or an alloy of tin, the cylindrical body 302 may be made of graphite or an alloy of tungsten and molybdenum covered with an asbestos cloth 306. The diameter of the cylindrical body with the cloth 306, if used, determines the height of the dam barrier, i.e., the distance from the uppermost portion of the dam barrier and the top surface of the molten metal.

As can be appreciated, in those instances where the cylindrical body is made of a material that has a density less than the density of the molten bath, it is recommended that the cylindrical body be provided with weights to maintain the dam barrier in the molten metal. For example, in the instance where the molten bath is tin or an alloy of tin and the cylindrical body is made of graphite, it is recommended that weights be provided to maintain the graphite submerged in the molten tin. For example, the weights may be bars of molybdenum or an alloy of tungsten and molybdenum embedded within the graphite body.

To facilitate (1) moving the dam barrier in the molten bath and (2) increasing or decreasing the number of dam barriers, it is recommended that the dam barriers be made up of two sections. In this manner a section can be lowered into the molten bath between the edge of the glass ribbon and adjacent sidewall. Thereafter the section of the dam barrier can be moved under the glass ribbon.

The discussion will now be directed to dam barriers which are movable toward and away from the surface of the molten bath. Referring to FIG. 17, there is shown a dam barrier 310. In general, the dam barrier 310 includes a member 312 made of a material that is nonreactive with the molten metal bath. The ends of the member are slideably mounted in slots 314 provided on the interior surface of the sidewalls 83 of the forming chamber 34. A groove 317 extends along the bottom of the forming chamber interconnected to the slots 314 to provide for movement of the dam barrier toward and away from the top surface of the molten metal.

As can be appreciated, the invention is not limited to the facilities for moving the dam barrier 310 toward or away from the top surface of the molten tin. Shown in FIG. 17 are facilities for displacing the member which may be used and are merely illustrative of types that may be employed.

The moving facilities 316 include a member 318 having bifurcated ends 320 and 322. The member 318 is pivotally mounted at 324 to the plate 81 of the forming chamber. Each of the bifurcated ends 320 and 322 receives a double headed nut 326 and 328, respectively. The nut 326 is threaded to a shaft 330 vertically mounted at one end to a stationary ledge member 332. The nut 328 is threaded to a shaft 334 in a vertical position operating on the dam barrier 312.

In the instance where the dam barrier is made of material that has a density less than the density of the molten metal, for example, graphite when the molten metal bath is tin, the moving facilities 316 are operated to prevent the dam barrier 312 from being raised by the molten tin. This may be accomplished by rotating the nuts 328 and/or 320 to pivot the member 318 away from the molten bath. When the dam barrier is to be lowered, the nuts 326 and/or 328 are rotated to pivot the end 322 toward the molten bath.

In the instance where the dam barrier has a density greater than the density of the molten metal, the threaded shaft 334 is securely mounted to the dam barrier. The arm 318 is pivoted to raise and lower the dam barrier in a similar manner as previously discussed.

Shown in FIGS. 18 and 19 is another type of dam barrier which has fewer operating positions. The dam barrier 350 is provided with a body 351 having an isoceles triangular cross-section. A shaft 352 is mounted at one end and off center. The shaft is rotatably mounted in the wall of the forming chamber at 354 in any conventional manner. The other end of the body is provided with a shaft 356 which is rotatably mounted in the opposed wall of the forming chamber at 358 in any conventional manner. A gear wheel 360 is advantageously securely mounted on the shaft 358.

A power gear wheel 362 is operatively connected with the gear wheel 360 and is operated by a shaft 364 extending through the sidewall of the forming chamber. To provide different positions, the shaft 362 is rotated in a first direction which rotates the dam barrier by way of gears 362 and 360 to decrease the distance between the dam barrier and the top surface of the molten metal.

Figure 20:
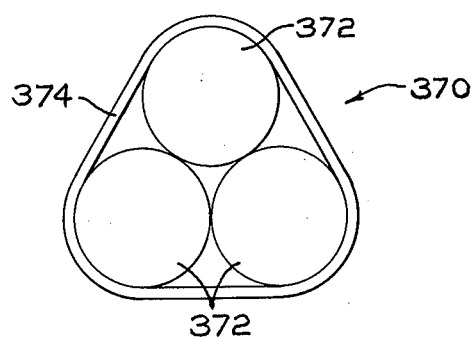

Referring to FIG. 20, there is shown an end view still of another embodiment of a dam barrier that may be used. Dam barrier 370 includes a plurality of cylindrical rods 372, e.g., 3 cylindrical rods that are held together by an asbestos cloth 374. The dam barrier 370 can be used in place of the member 351 of the dam barrier 350 (see FIGS. 18 and 19) or can be used in a similar manner as is the dam barrier 300 (see FIGS. 15 and 16).

Although the dams of the invention were discussed with the glassmaking process as disclosed in U.S. Pat. application No. 483,508, it can now be appreciated that the invention is not limited thereto and has utility in any glassmaking process in which a sheet or ribbon of glass is moved through a forming chamber on a pool of supporting molten metal.

DETAILED DESCRIPTION OF THE INVENTION

The dam barriers incorporating features of the invention will be used with the glassmaking furnace disclosed in U.S. Pat. application Ser. No. 483,508 filed on June 27, 1974, in the name of Gerald E. Kunkle and entitled "Manufacture of Glass."

Referring to FIG. 1, there is shown a glassmaking apparatus 30 similar to the one disclosed in the above mentioned patent. In general, the glassmaking apparatus 30 includes a glassmaking furnace 32, delivery facility 46 connecting the furnace 32 to a forming chamber 34.

Glassmaking ingredients (not shown) are feed into a melting section of the furnace 36 and are melted to form a molten pool of glass 58. The molten pool of glass moves into a refining section 36 of the furnace 32 where the molten glass is refined. The refined molten glass 44 flows over a threshold 48 of the delivery facility onto molten tin 86 contained in the forming chamber.

Pipes 54 are embedded in threshold 48 which can advantageously control the temperature of the molten glass. The flow of molten glass is controlled by a control tweel 68 which is raised and lowered by a support assembly 70 (not fully shown).

The forming chamber 34 includes a bottom casing 74 made of steel and supported on a support 76 in addition to support 52. Disposed within the bottom casing 74 is a refractory bottom 78 that has been cast in place inside the bottom casing. The dimensions of the forming chamber 34 are approximately 10 feet by 10 feet.

Embedded within the bottom refractory 78 are 6 pipes 80 through which coolant may be drawn, if desired, to extract heat from the molten tin. The pipes are on a center-to-center spacing of 15 inches with the pipe 80 adjacent the threshold spaced about 31 inches from the downstream end of the threshold 48.

With reference to FIGS. 1 and 2, the refractory sidewalls 83, exit lip 84, the downstream end of the threshold 48 and bottom 78 define a container into which a molten pool of tin 86 is disposed. The molten tin has a depth to about 2⅜ inches adjacent the exit lip 84 and a depth of about 2½ inches adjacent the downstream end of the threshold 48.

At the downstream end of the forming chamber 34 there are provided extensions 88 in the bottom container portion of the forming chamber which serve as cavities into which dross floating on the surface of the molten tin 86 may be withdrawn for removal from the forming chamber 34.

Referring now to FIG. 1, the upper portion of the forming chamber includes an end wall liner 90 made of refractory material. At the upstream end or inlet end of the forming chamber is a lintel 96 which supports roof 60 of the delivery facility 46. Additionally, the upper portion of the forming chamber includes a roof 98 made of a refractory material.

Extending through the forming chamber are heating elements 100 extending from the downstream end toward the upstream end of the forming chamber. Each of the heating elements 100 are connected to bus bar 102 which are advantageously connected in turn to a source of power (not shown) such as the type shown in the art.

The molten glass 72 is delivered onto the tin 86. As the molten glass moves downstream through the forming chamber the temperature of the glass is monotonically and constantly cooled to form a glass ribbon 108. At a point about 101 inches from the center of the control tweel the glass ribbon is vertically raised and vertically conveyed out of the forming chamber 34 by way of rollers 118 of vertical conveyor 106.

EXAMPLE I

The dam barriers of the invention will be used with the glassmaking apparatus as previously discussed to produce a continuous glass ribbon of equilibrium thickness, e.g., about 0.270 inches (0.68 centimeters) thick.

Referring to FIGS. 1 and 2, there is positioned dam barriers 129, 130, 131, 132, and 133 spaced 24 inches (61 centimeters), 39 inches (99 centimeters), 54 inches (137.2 centimeters), 69 inches (175.3 centimeters) and 84 inches (213.4 centimeters), respectively, from the downstream end of the threshold 48. The dam barriers 129–133 are of the type shown in FIGS. 15 and 16. The dam barriers each include a pair of cylindrical roll bodies 302 about 4½ feet (1.4 meters) in length made of an alloy of tungsten and molybdenum. Covering the pair of cylindrical rolls is an asbestos cloth 306, ⅛ inch thick (3.1 millimeters). A plate 304 made of an alloy of tungsten and molybdenum is provided on each roll body to prevent the dam barrier from rolling along the bottom of the forming chamber.

The dam barriers 129, 130, 131, 132 and 133 are spaced about 1 inch (2.54 centimeters); 1 inch (2.54 centimeters); 1 inch (2.54 centimeters); 7/8 inch (2.2 centimeters); and 7/8 inch (2.2 centimeters) respectively, from the top surface of the molten tin. In this example the coolers 80 immediately downstream of the threshold 48 are turned off and do not extract any heat from the molten tin.

The temperature of the glass at selected points as the glass moves through the forming chamber is as shown in Table I. The temperature was taken with radiation pyrometers mounted through the roof 98 of the forming chamber 34.

TABLE I

| Distance from centerline of control tweel 68 | Temperature |
|---|---|
| 32 inches (81.3 centimeters) | 1850°F. (1010°C) |
| 72 inches (182.9 centimeters) | 1550°F. (845°C) |

EXAMPLE II

The dam barriers of the invention will now be used to manufacture a continuous glass sheet or ribbon having a thickness of about 0.125 inches (3.1 millimeters).

The apparatus is as discussed in Example I with the following exceptions.

The dam barrier 129 is about 1 inch (2.54 centimeters) from the top surface of the molten tin and spaced about 24 inches (61 centimeters) from the downstream end of the threshold 48. The dam barrier 130 is spaced about 1 inch (2.54 centimeters) from the top surface of the molten tin and spaced about 41 inches (104.1 centimeters) from the downstream end of the threshold 48. The dam barrier 131 is spaced about 1 inch (2.54 centimeters) from the top surface of the molten tin and spaced about 56 inches (142.2 centimeters) from the downstream end of the threshold 48. The dam barrier 59 is spaced about 7/8 inch (2.2 centimeters) from the top surface of the molten tin and spaced about 59 inches (150 centimeters) from the downstream end of the threshold.

The dam barrier 133 was removed from the forming chamber.

As before, the coolers 80 immediately downstream of the threshold 48 were not used.

Extending into the forming chamber 34 through its sidewalls 82 are two edge contact devices 112 of the type used in the art for applying outward tractive forces to opposed edges of glass.

The temperature of the glass as it moves through the forming chamber is as shown in Table II.

TABLE II

| Distance from centerline of control tweel 68 | Temperature |
|---|---|
| 32 inches (81.3 centimeters) | 1875°F. (1020°C.) |
| 72 inches (182.9 centimeters) | 1600°F. (870°C.) |

While the several embodiments of this invention have been described and illustrated by reference to detailed specific examples, those skilled in the art will recognize that variations may be made from the described methods and devices without departing from the scope of the invention.

What is claimed is:

1. In a method of making a continuous ribbon of flat glass which comprises providing a layer of molten glass on the surface of a pool of supporting molten metal; advancing the layer of glass along the surface of the pool of molten metal in a downstream direction from upstream locations to succeeding downstream locations; and controlling the temperature of the layer of glass to cool the layer of glass to form a dimensionally stable ribbon of flat glass of a specified thickness wherein at least a portion of the cooling of the advancing layer of glass being by transfer of heat to the molten metal, the improvement, associated with changing from forming glass of a first specified thickness to forming glass of a second thinner specified thickness, comprising:

positioning movable dam barriers in the molten metal and extending at least partially transversely to the direction of glass advance to change the pattern of heat removal from the layer of glass within a sizing region in which the glass is at a temperature within its sizing temperature range by decreasing the spacing between at least two adjacent dam barriers in a downstream portion of the region from their spacing when forming glass of the first specified thickness.

2. The improved method as set forth in claim 1 wherein said positioning step is accomplished by:

moving a dam barrier in the downstream portion of the sizing region in a direction opposite to the direction of advance of the layer of glass.

3. The method as set forth in claim 1 comprising the further step of increasing the spacing between two adjacent dam barriers in an upstream portion of the sizing region from their spacing when forming glass of the first specified thickness.

4. The improved method as set forth in claim 3 wherein said positioning step is accomplished by:

moving a dam barrier in an upstream portion of the sizing region in the same direction as the advance of the layer of glass.

5. The improved method as set forth in claim 4 wherein said positioning step is accomplished by:

removing a dam barrier from the molten metal in the upstream portion of the sizing region.

6. The improved method as set forth in claim 1 wherein said positioning step is accomplished by:

inserting a dam barrier in the molten metal in the downstream portion of the sizing region.

7. In a method of making a continuous ribbon of flat glass which comprises providing a layer of molten glass on the surface of a pool of supporting molten metal; advancing the layer of glass along the surface of the pool of molten metal in a downstream direction from upstream locations to succeeding downstream locations; and controlling the temperature of the layer of glass to cool the layer of glass to form a dimensionally stable ribbon of flat glass of a specified thickness wherein at least a portion of the cooling of the advancing layer of glass being by transfer of heat to the molten metal, the improvement, associated with changing from forming glass of a first specified thickness to forming glass of a second thicker specified thickness, comprising:

positioning movable dam barriers in the molten metal and extending a least partially transversely to the direction of glass advance to change the pattern of heat removal from the layer of glass within a sizing region in which the glass is at a temperature within its sizing temperature range by increasing the spacing between at least two adjacent dam barriers in a downstream portion of the region from their spacing when forming glass of the first specified thickness.

8. The improved method as set forth in claim 7 wherein said positioning step is accomplished by:

moving a dam barrier in the downstream portion of the sizing region in the same direction as the advance of the layer of glass.

9. The method as set forth in claim 7 comprising the further step of decreasing the spacing between two adjacent dam barriers in an upstream portion of the sizing region from their spacing when forming glass of the first specified thickness.

10. The improved method as set forth in claim 9 wherein said positioning step is accomplished by:

moving a dam barrier in an upstream portion of the sizing region in a direction opposite to the direction of advance of the layer of glass.

11. The improved method as set forth in claim 10 wherein said positioning step is accomplished by:
   inserting a dam barrier in the molten metal in the upstream portion of the sizing region.

12. The improved method as set forth in claim 7 wherein said positioning step is accomplished by:
   removing a dam barrier from the molten metal in the downstream portion of the sizing region.

13. In a method of making a continuous ribbon of flat glass which comprises providing a layer of molten glass on the surface of a pool of supporting molten metal; advancing the layer of glass along the surface of the pool of molten metal in a downstream direction from upstream locations to succeeding downstream locations; and controlling the temperature of the layer of glass to cool the layer of glass to form a dimensionally stable ribbon of flat glass of a specified thickness wherein at least a portion of the cooling of the advancing layer of glass is by transfer of heat to the molten metal, the improvement comprising:
   arranging at least two pairs of dam barriers in the molten metal such that a line drawn through each dam barrier of a pair of dam barriers in a direction opposite to the advance of the glass intersects with a similar line drawn through the other dam barrier of the pair, said two pairs of dam barriers providing compartments of molten metal between adjacent dam barriers which provide for the free circulation of molten metal between an upstream location spaced a first distance inwardly from a side of the pool of molten metal beneath the advancing glass and a downstream location spaced a second lesser distance inwardly from the same side of the pool of molten metal.

14. In an apparatus for making flat glass wherein the apparatus is of the type having a glass melting furnace for supplying molten glass for forming; a glass forming chamber having a bottom and side portions for containing a pool of supporting molten metal; delivery means connecting the exit end of the furnace and entrance end of the forming chamber for moving the molten glass from the furnace to the forming chamber to provide a layer of molten glass on the pool of supporting molten metal wherein the molten glass as it advances along the molten metal is cooled to form a continuous glass ribbon of a specified thickness wherein at least a portion of the cooling of the glass being by transfer of heat to the molten metal and means for continuously removing the glass ribbon from the forming chamber, the improvement comprising:
   movable dam barriers mounted on the bottom of the forming chamber, each of said dam barriers comprising an outer cover of material which is substantially non-reactive with the molten metal and an inner body of material having a density greater than that of the molten metal.

15. The apparatus as set forth in claim 14 wherein at least one of said dam barrier comprises:
   a cylindrical body; and
   means mounted on said body to prevent rolling motion of said body.

16. The apparatus as set forth in claim 15 wherein said cylindrical body is in at least two sections to permit insertion of the dam barrier beneath the glass ribbon.

17. The apparatus as set forth in claim 14 wherein said body is made of an alloy of tungsten and molybdenum.

18. The apparatus as set forth in claim 17 wherein said cover is an asbestos cloth.

19. The apparatus as set forth in claim 14 wherein the cover is made of graphite and the body has a density sufficiently greater than the density of the molten metal to increase the density of the body and cover in combination to be effectively greater than that of molten metal.

20. The apparatus as set forth in claim 14 wherein the body of said dam barrier is made of a plurality of cylindrical roll members securely joined together.

21. The apparatus as set forth in claim 20 wherein each of said plurality of cylindrical roll members is made of an alloy of tungsten and molybdenum and the cover comprises an asbestos cloth around said plurality of cylindrical rolls.

22. The apparatus as set forth in claim 14 further comprising:
   means for vertically removing the glass sheet from the forming chamber.

23. The apparatus as set forth in claim 14 further comprising:
   means for horizontally removing the glass sheet from the forming chamber.

24. In an apparatus for making flat glass wherein the apparatus is of the type having a glass melting furnace for supplying molten glass for forming; a glass forming chamber having a bottom and side portions for containing a pool of supporting molten metal; delivery means connecting the exit end of the furnace and entrance end of the forming chamber for moving the molten glass from the furnace to the forming chamber to provide a layer of molten glass on the pool of supporting molten metal wherein the molten glass as it advances along the molten metal is cooled to form a continuous glass ribbon of a specified thickness wherein at least a portion of the cooling of the glass being by transfer of heat to the molten metal and means for continuously removing the glass ribbon from the forming chamber, the improvement comprising:
   a dam barrier member having a triangular cross-section extending at least partially across the chamber within the pool of molten metal; and
   means for rotating said dam barrier members to vary the distance between said dam barrier member and the top surface of the molten metal.

* * * * *

UNITED STATES PATENT OFFICE
CERTIFICATE OF CORRECTION

PATENT NO. : 3,930,829

DATED : January 6, 1976

INVENTOR(S) : John E. Sensi

It is certified that error appears in the above-identified patent and that said Letters Patent are hereby corrected as shown below:

Column 13, line 4, change "ro" to --to--.

Column 15, line 23, change "in" to --In--.

Column 15, line 39, change "as" to --are--.

Claim 7, line 17 change "a" to --at--.

Signed and Sealed this twentieth Day of April 1976

[SEAL]

Attest:

RUTH C. MASON
Attesting Officer

C. MARSHALL DANN
Commissioner of Patents and Trademarks